US008567284B2

(12) United States Patent
Huang

(10) Patent No.: US 8,567,284 B2
(45) Date of Patent: Oct. 29, 2013

(54) ASSEMBLY STRUCTURE OF FAUCET CONTROL HANDLE

(75) Inventor: Li-Chen Huang, Changhua (TW)

(73) Assignee: Alexander Yeh Industry Co. Ltd., Changhua (TW)

( * ) Notice: Subject to any disclaimer, the term of this patent is extended or adjusted under 35 U.S.C. 154(b) by 272 days.

(21) Appl. No.: 13/267,636

(22) Filed: Oct. 6, 2011

(65) Prior Publication Data

US 2013/0087218 A1    Apr. 11, 2013

(51) Int. Cl.
*F16K 31/60* (2006.01)
(52) U.S. Cl.
CPC ...................................... *F16K 31/60* (2013.01)
USPC ............... 74/543; 74/548; 137/801; 137/359; 137/315.15; 137/625.41; 251/288; 251/323
(58) Field of Classification Search
USPC .................... 74/543–548; 137/801, 269, 359, 137/625.41; 251/288, 292, 323; 16/414, 16/441; 4/678
See application file for complete search history.

(56) References Cited

U.S. PATENT DOCUMENTS

| 6,666,227 | B2 * | 12/2003 | Erickson | 137/270 |
| 8,459,145 | B2 * | 6/2013 | Huang | 74/543 |
| 8,479,609 | B2 * | 7/2013 | Huang | 74/543 |
| 2010/0252131 | A1 * | 10/2010 | Rosko et al. | 137/625.4 |
| 2013/0036853 | A1 * | 2/2013 | Huang | 74/523 |
| 2013/0036855 | A1 * | 2/2013 | Huang | 74/543 |

* cited by examiner

*Primary Examiner* — Vinh Luong
(74) *Attorney, Agent, or Firm* — Che-Yang Chen; Law Office of Michael Chen

(57) ABSTRACT

An assembly structure of a faucet control handle that used in different sizes of water control bases includes a control handle and an adjustable unit, wherein a receiving space of the control handle has a first and a second wedging ribs cross each other at the periphery of an opening of the receiving space. The adjustable unit has an adjustable base, a clamping piece and an adjustable element, wherein the adjustable base has a connecting hole that forms a wedging edge at one end thereof, and the clamping piece that can be adjusted is formed facing the wedging edge. Since the control handle's receiving space has the adjustable unit, the faucet handle in the present invention can be used in different water control bases with different sizes of water control sticks to increase the practicability of the faucet handle, and further increase the convenience during the assembly process.

2 Claims, 9 Drawing Sheets

ASSEMBLY STRUCTURE OF FAUCET CONTROL HANDLE

FIELD OF THE INVENTION

The present invention relates to an assembly structure of faucet control handle, and more particularly refers to a receiving space of a control handle having an adjustable unit, which can be applied to different sizes of water control sticks, to increase the practicability of the faucet handle and convenience for assembly.

BACKGROUND OF THE INVENTION

In recent years, the "DIY" style has become popular and people focus more on entire appearance of the faucet, so most people try to replace the faucet handle by themselves start to get rid of the appearance of the old faucet and achieve the goal of changing the exterior of the faucet and eliminating the old thereof. However, various faucets are different in sizes that cause the corresponding the faucet handles vary in size as well, and it is difficult for customers to purchase a suitable faucet handle, which further cause a problem in assembling and replacing the faucet. This is the problem the present invention wants to solve.

SUMMARY OF THE INVENTION

The technical problem to be solved in the present invention is that various faucets are different in sizes that cause the corresponding the faucet handles vary in size as well, and it is difficult for customers to purchase a suitable faucet handle, which further cause a problem in assembling and replacing the faucet. This is the problem the present invention wants to solve.

The technical point to solve the problem mentioned above is that the present invention provides an assembly structure of a faucet control handle that can be used in various water control bases includes: a control handle which recessedly forms a receiving space that protrudingly forms a first wedging rib and a second wedging rib cross each other at the opening end of the receiving space, and has a connecting unit protrudingly located at the periphery of the opening end thereof. The first wedging rib extends to the connecting unit and forms a recessed opening near the connecting unit. The connecting unit has a through hole on an inner portion through an outer periphery, and the through hole provides a locking unit. The assembly structure also has an adjustable unit including an adjustable base, a clamping piece and an adjustable element, wherein the adjustable base is located at the receiving space of the control handle, and the adjustable base has a connecting hole that has a wedging edge at an inner periphery. The wedging edge has a screw hole is formed facing the wedging edge, and an engaging hole is formed near the screw hole. The adjustable base engages with the first and second wedging ribs and the connecting unit of the control handle, and a plurality of positioning slots and a cut slot are formed facing the connecting hole. The positioning slots and cut slot are provided for the first and second wedging ribs and the recessed opening of the first wedging rib. An indenture is formed at a periphery of the engaging hole that connects with the cut slot to provide for engagement with the recessed opening of the first wedging rib. The clamping piece has a clamping surface inside that has a plurality of recessed edges, and the clamping surface has a second through hole. The adjustable element has a screw section at an outer periphery that can be engaged with the screw hole of the adjustable base. A top portion is tapered and formed at an upper portion of the screw section, and a stopping surface is formed at the tapered portion and is against an outside portion of the clamping piece. The assembly structure of the faucet control handle is thus obtained.

Comparing to conventional art: the present invention provides an assembly structure of a faucet control handle that is advantageous because the receiving space of the control handle has an adjustable unit, so the faucet handle in the present invention can be used in different water control sticks with different sizes to increase the practicability of the faucet handle, and further increase the convenience during the assembly process.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
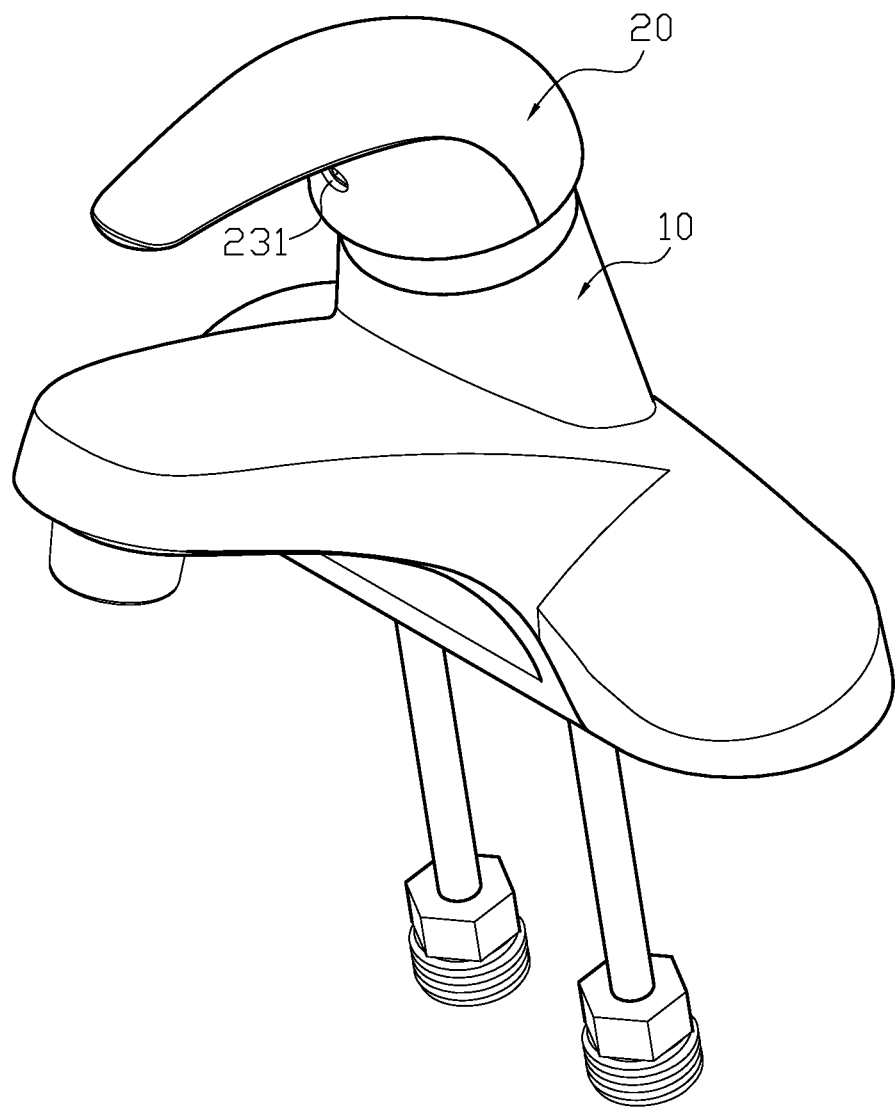
FIG. 1 illustrates a three-dimensional assembled view in the present invention.
Figure 2:
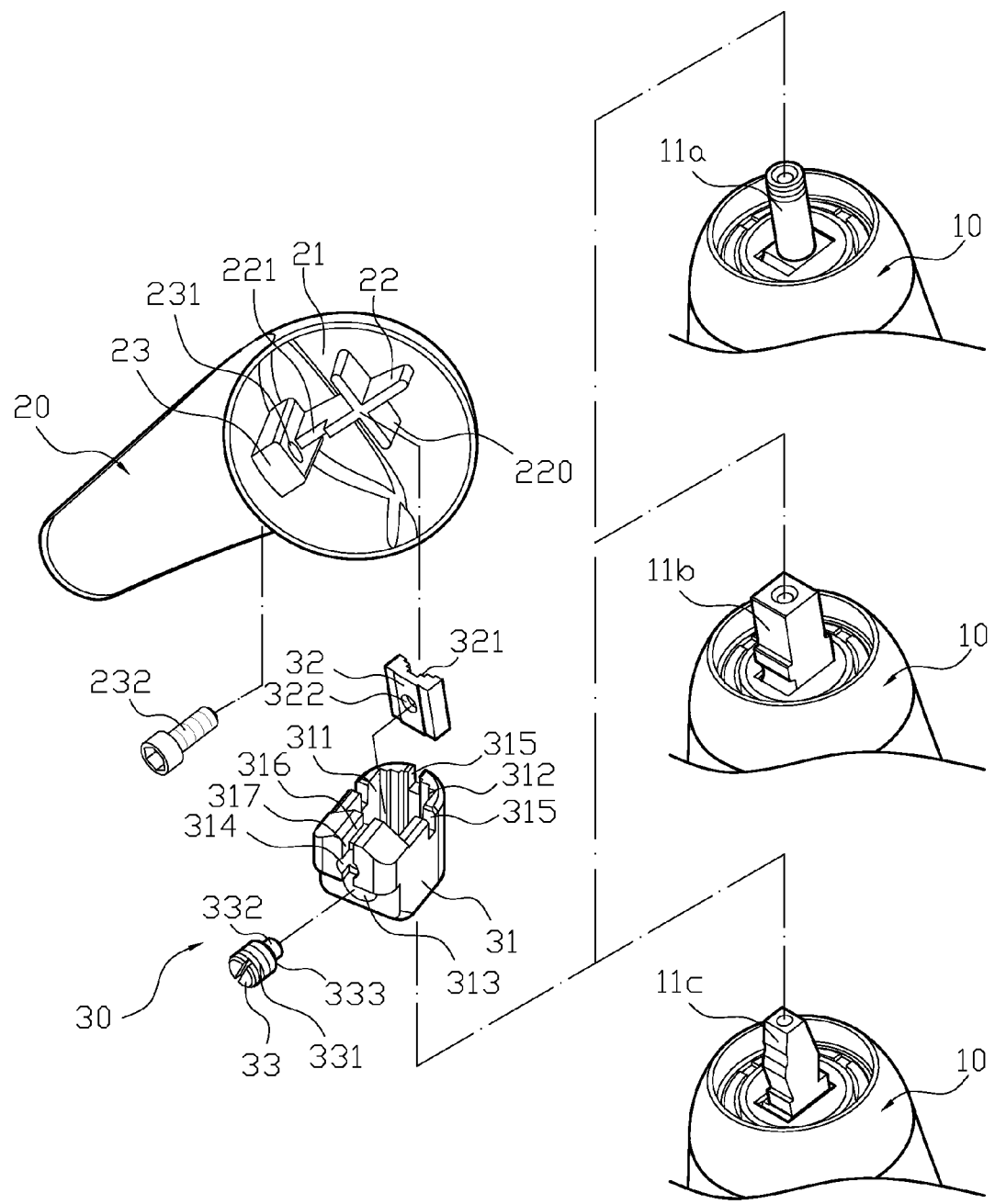
FIG. 2 illustrates a three-dimensional exploded view in the present invention.

In order to further understand the goal, characteristics and effect of the present invention, a number of embodiments along with the drawings are illustrated as following:

Referring to FIGS. 1 to 2, an assembly structure of a faucet control handle that can be used in various water control bases (10) includes: a control handle (20) and an adjustable unit (30), wherein the control handle (20) recessedly forms a receiving space (21) that protrudingly forms a first wedging rib (22) and a second wedging rib (220) cross each other at the opening end of the receiving space (21), and has a connecting unit (23) protrudingly located at the periphery of the opening end thereof. The first wedging rib (22) extends to the connecting unit (23) and forms a recessed opening (221) near the connecting unit (23). The connecting unit (23) has a through hole (231) on an inner portion through an outer periphery, and the through hole (231) provides a locking unit (232). The adjustable unit (30) has an adjustable base (31), a clamping piece (32) and an adjustable element (33), wherein the adjustable base (31) is located at the receiving space (21) of the control handle (20), and the adjustable base (31) has a connecting hole (311) that has a wedging edge (312) at an inner periphery. The wedging edge (312) has a plurality of recessed edges, and a screw hole (313) is formed facing the wedging edge (312), and an engaging hole (314) is formed near the screw hole (313). The adjustable base (31) engages with the first and second wedging ribs (22) (220) and the connecting unit (23) of the control handle (20), and a plurality of positioning slots (315) and a cut slot (316) are formed facing the connecting hole (311). The positioning slots (315) and cut slot (316) are provided for the first and second wedging ribs (22) (220) and the recessed opening (221) of the first wedging rib (22). An indenture (317) is formed at a periphery of the engaging hole (314) that connects with the cut slot (316) to provide for engagement with the recessed opening of the first wedging rib (22). The clamping piece (32) has a clamping surface (321) inside that has a plurality of recessed edges, and the clamping surface (321) has a second through hole (322). The adjustable element (33) has a screw section (331) at an outer periphery that can be engaged with the screw hole (313) of the adjustable base (31). A top portion (332) is tapered and formed at an upper portion of the screw section (331), and a stopping surface (333) is formed at the tapered portion and is against an outside portion of the clamping piece (32).

Referring to FIG. 2 for a practical use in the present invention, the faucet control handle can fit in water control sticks (11*a*) (11*b*) (11*c*) of various of water control bases (10), wherein one water control stick (11*a*) is cylindrical, one water control stick (11*b*) is square column, and another one water control stick (11*c*) is a column with inclined surfaces on both sides.

Figure 3:
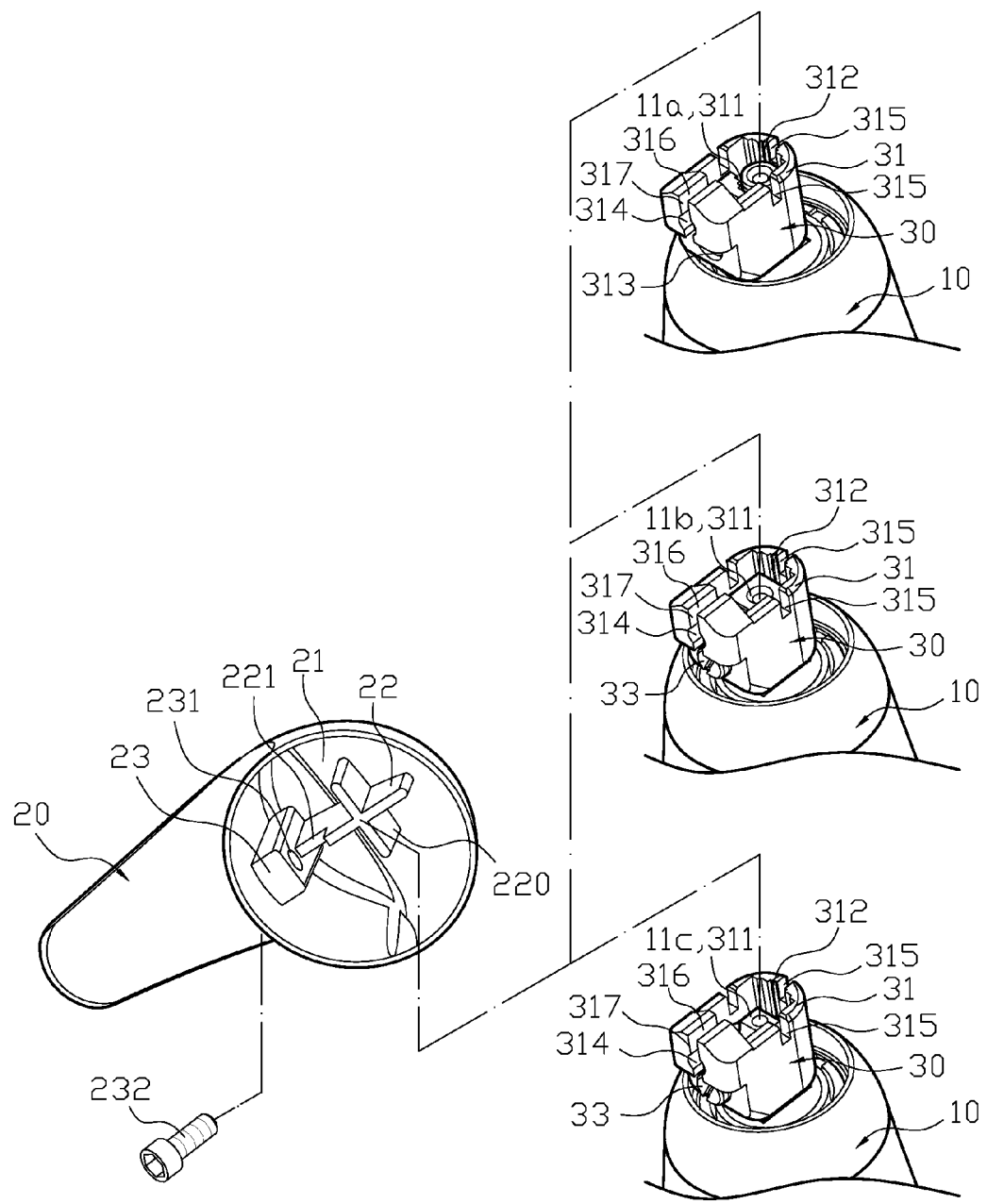
FIG. 3 illustrates a first view of the assembly process in the present invention.
Figure 4:
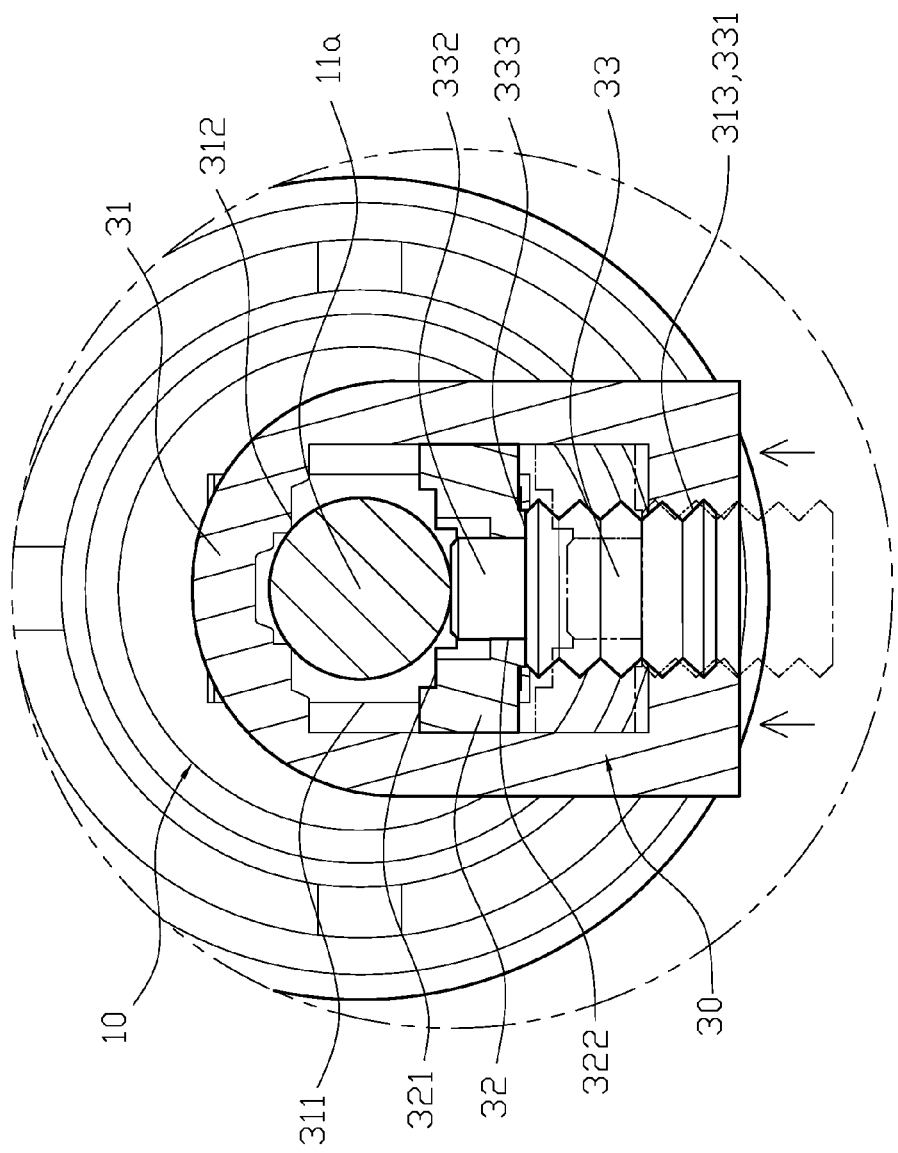
FIG. 4 illustrates a second view of the assembly process in the present invention.
Figure 5:
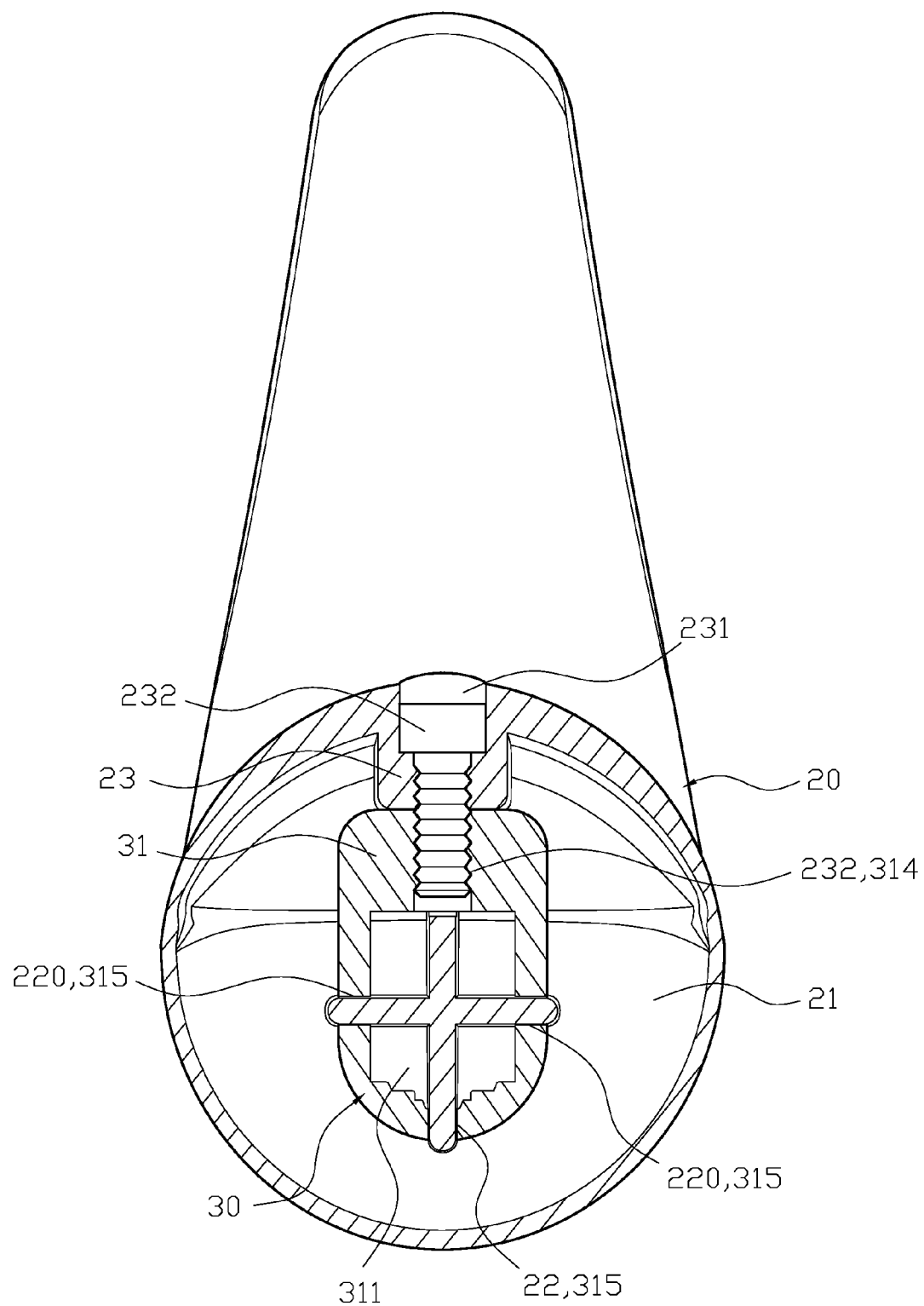
FIG. 5 illustrates a sectional view of the combination of the control handle and adjustable unit in the present invention.
Figure 6:
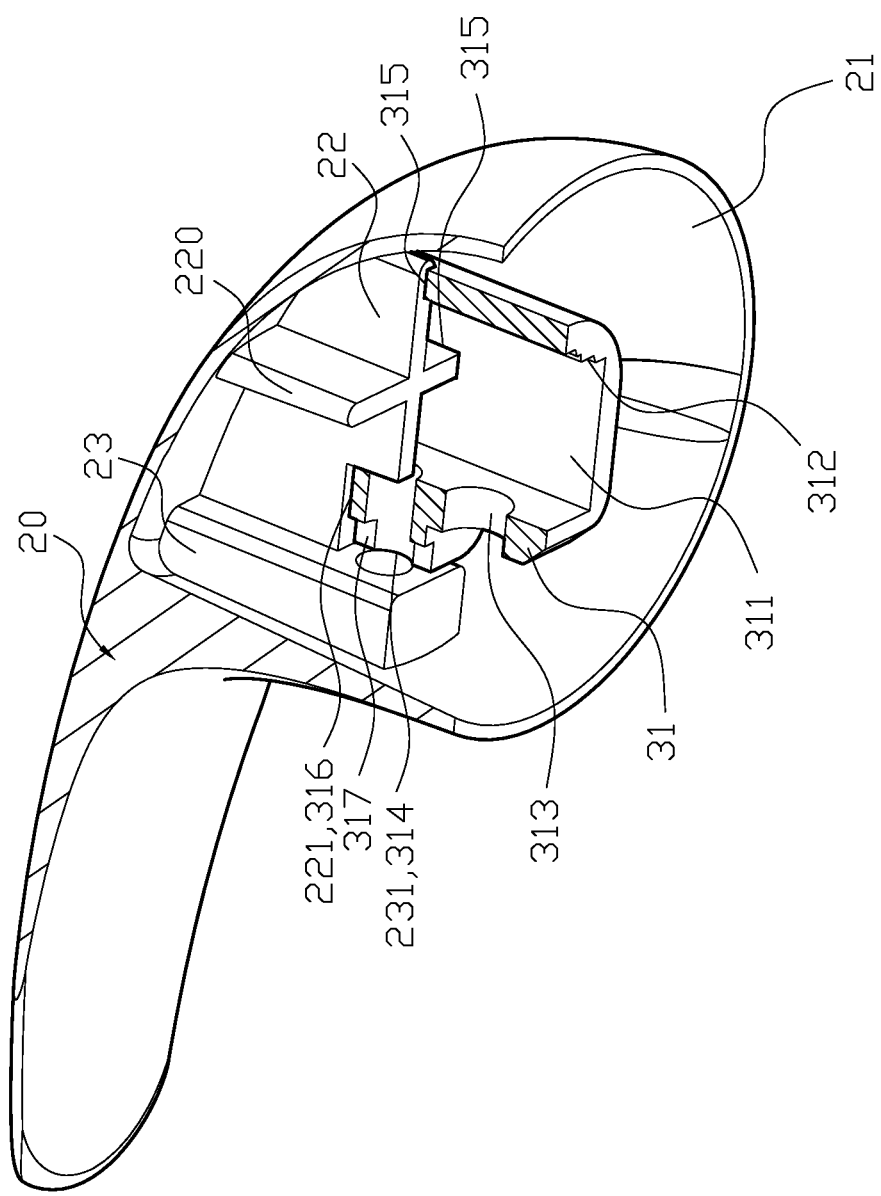
FIG. 6 illustrates a three-dimensional sectional view of the combination of the control handle and adjustable unit in the present invention.
Figure 7:
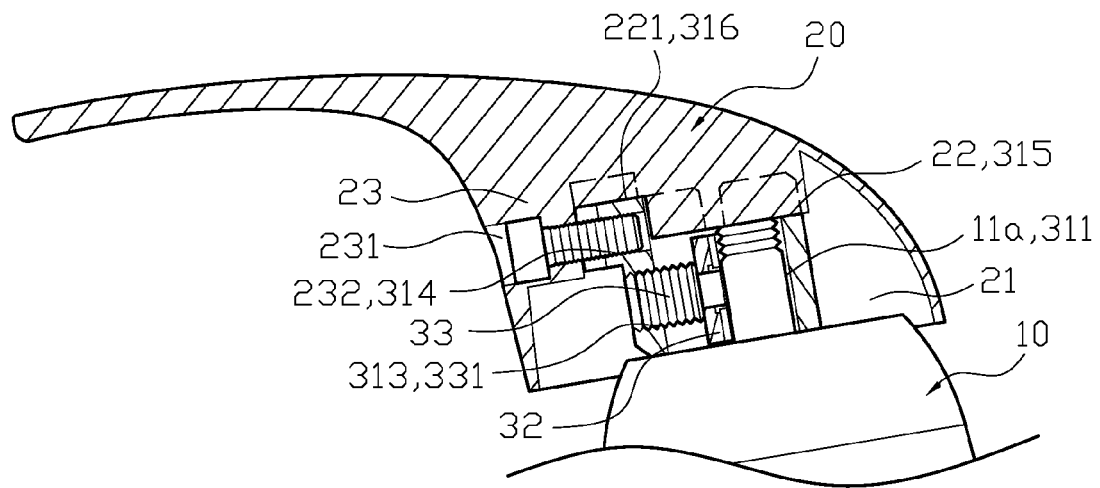
FIG. 7 illustrates a first sectional view of the first assembly type in the present invention.
Figure 8:
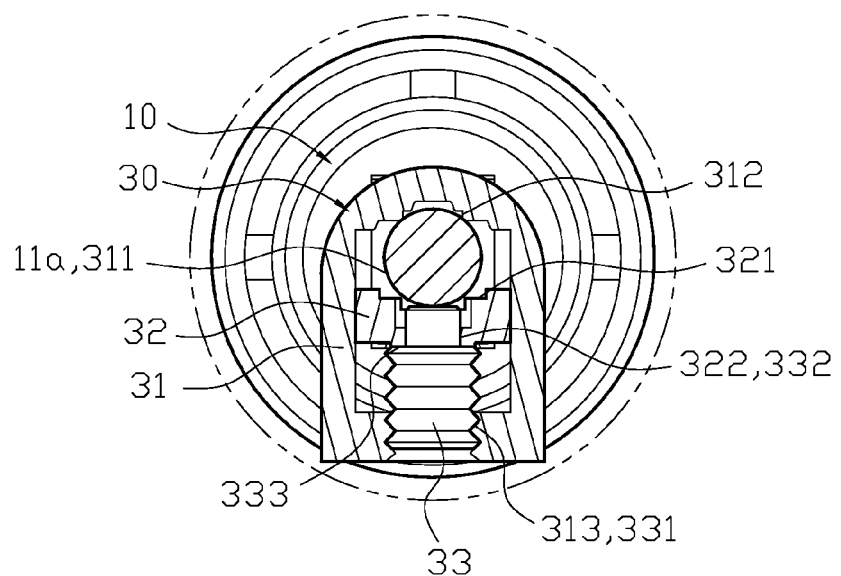
FIG. 8 illustrates a second sectional view of the first assembly type in the present invention.
Figure 9:
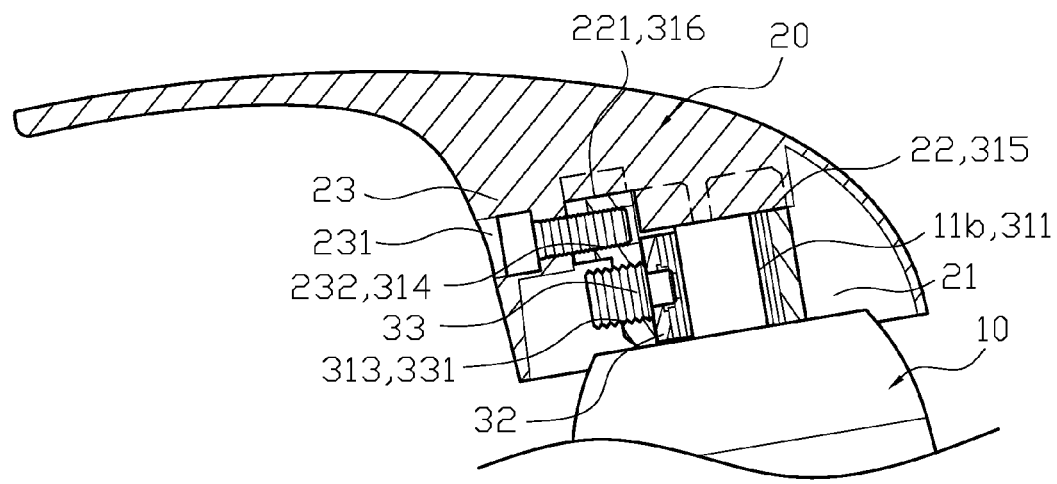
FIG. 9 illustrates a first sectional view of the second assembly type in the present invention.
Figure 10:
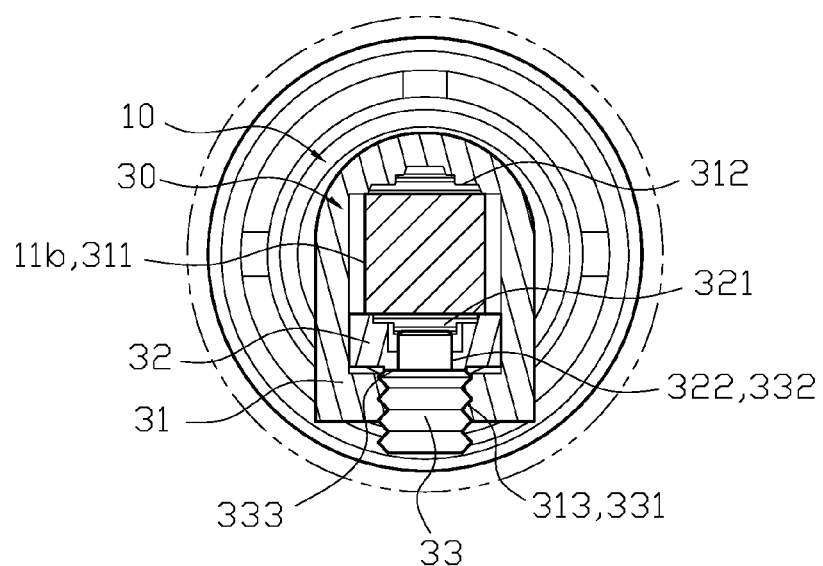
FIG. 10 illustrates a second sectional view of the second assembly type in the present invention.
Figure 11:
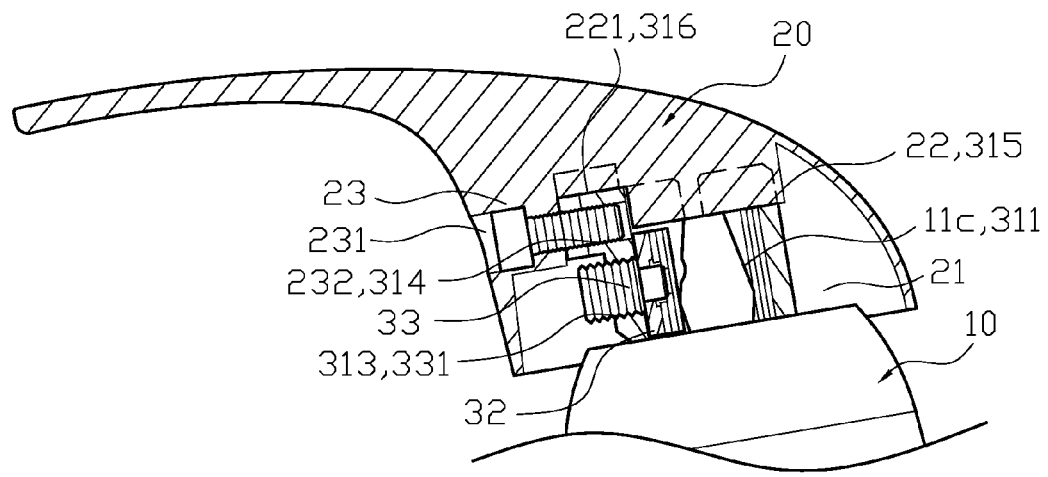
FIG. 11 illustrates a first sectional view of the third assembly type in the present invention.
Figure 12:
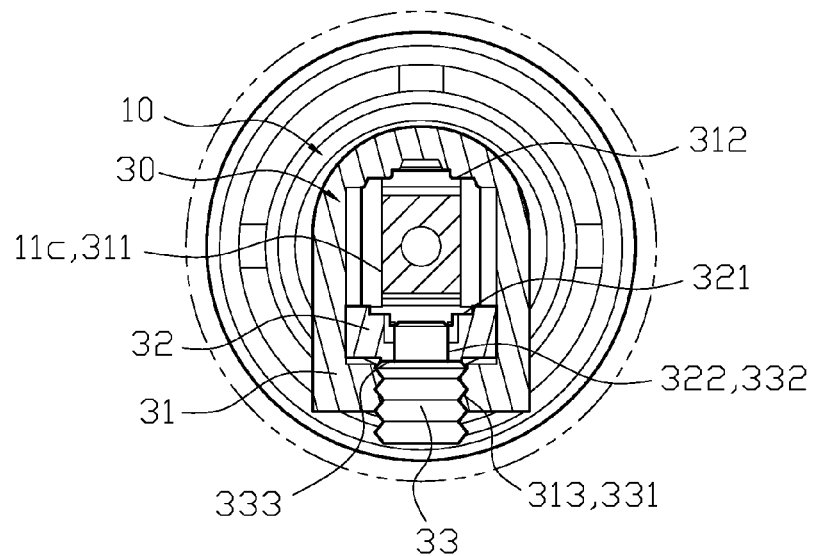
FIG. 12 illustrates a second sectional view of the third assembly type in the present invention.

Referring to FIGS. 2 and 3, when the control handle (20) is coupled with the water control sticks (11*a*) (11*b*) (11*c*) of the water control base (10), the connecting hole (311) of the adjustable base (31) in the adjustable unit (30) covers the control sticks (11*a*) (11*b*) (11*c*), and the adjustable element (33) is rotated into the wedging edge (312) of the adjustable base (31), so that the clamping piece (32) is pushed by the stopping surface (333) of the adjustable element (33) to generate simultaneous movement (see FIG. 4) and the water control sticks (11*a*) (11*b*) (11*c*) can be located between the wedging edge (312) and the clamping surface (321), and are pressed by the top portion (332) of the adjustable element (33) to form a secure position (see FIGS. 8, 10, 12). Since the movement of the clamping piece (32) can be adjusted by screwing the adjustable element (33), the adjustable unit (30) can be used in different sizes of control sticks (11*a*) (11*b*) (11*c*). Also, since the wedging edge (312) of the adjustable base (31) and the clamping surface (321) of the clamping piece (32) both have a plurality of recessed edges, the adjustable unit (30) can be used in different styles of control sticks (11*a*) (11*b*) (11*c*) to further improve the practicability of the adjustable unit (30). The control handle (20) is then disposed at the outer periphery of the adjustable base (31) via the receiving space (21). Since the receiving space (21) of the control handle (20) protrudingly forms the first wedging rib (22) and second wedging rib (220) cross each other at the opening end of the receiving space (21), first wedging rib (22) and second wedging rib (220) has to engage with the positioning slot (315) of the adjustable base (31) first to form a preliminary positioning of the control handle (20) (see FIG. 5) to improve the convenience during assembly process of the control handle (20). Furthermore, because the connecting hole (311) of the adjustable base (31) has the cut slot (316), and the indenture (317) connecting with the cut slot is formed near the engaging hole (314), the recessed opening (221) of the first wedging rib (22) can be engaged to align the through hole (231) of the control handle (20) with the engaging hole (314) of the adjustable base (31), to avoid the processing error caused by shaking when disposing the first wedging rib (22) and second wedging rib (220) of the control handle (20) on the positioning slot (315) and the cut slot (316), and the positioning of the control handle (20) is further enhanced (see FIG. 6). The locking unit (232) can be locked at the engaging hole (314) of the adjustable unit (30) (see FIGS. 7, 9, 11) to further increase the convenience when assembling the control handle (20) to complete the assembly process.

According to the structure in the abovementioned embodiments, the present invention has the following advantages: (a) the receiving space (21) of the control handle (20) has the adjustable unit (30), so the control handle in the present invention can be used in different water control sticks (11*a*) (11*b*) (11*c*) of the water control base (10) to increase the practicability of the faucet handle, and further increase the convenience during the assembly process; (b) the receiving space (21) of the control handle (20) protrudingly forms the first wedging rib (22) and second wedging rib (220) cross each other at the opening end of the receiving space (21), first wedging rib (22) and second wedging rib (220) has to engage with the positioning slot (315) of the adjustable base (31) first to form a preliminary positioning of the control handle (20); and (c) the connecting hole (311) of the adjustable base (31) has the cut slot (316), and the indenture (317) connecting with the cut slot is formed near the engaging hole (314), the recessed opening (221) of the first wedging rib (22) can be engaged to align the through hole (231) of the control handle (20) with the engaging hole (314) of the adjustable base (31), to avoid the processing error caused by shaking when disposing the first wedging rib (22) and second wedging rib (220) of the control handle (20) on the positioning slot (315) and the cut slot (316), and the positioning of the control handle (20) is further enhanced.

Having described the invention by the description and illustrations above, it should be understood that these are exemplary of the invention and are not to be considered as limiting. Accordingly, the invention is not to be considered as limited by the foregoing description, but includes any equivalent.

What is claimed is:

1. An assembly structure of a faucet control handle that is configured to use in various water control bases of different sizes, comprising:

a control handle which recessedly forms a receiving space that protrudingly forms a first wedging rib and a second wedging ribs cross each other at an opening end of the receiving space, and said receiving space has a connecting unit protrudingly located at a periphery of the opening end thereof, wherein the first wedging rib extends to the connecting unit and forms a recessed opening near the connecting unit, and the connecting unit has a through hole on an inner portion through an outer periphery, which provides a locking unit; and an adjustable unit including an adjustable base, a clamping piece and an adjustable element, wherein the adjustable base is located at the receiving space of the control handle, and the adjustable base has a connecting hole that has a wedging edge at an inner periphery, wherein the wedging edge has a screw hole formed facing the wedging edge, and an engaging hole is formed near the screw hole, and the adjustable base engages with the first and second wedging ribs and the connecting unit of the control handle, and a plurality of positioning slots and a cut slot are formed facing the connecting hole, wherein the positioning slots and cut slot are provided for the first and second wedging ribs and the recessed opening of the first wedging rib, and an indenture is formed at a periphery of the engaging hole that connects with the cut slot to provide for engagement with the recessed opening of the first wedging rib, wherein the clamping piece has a clamping surface inside that has a plurality of recessed edges, and the clamping surface has a second through hole, wherein the adjustable element has a screw section at an outer periphery configured to engage with the screw hole of the adjustable base, wherein a top portion is tapered and formed at an upper portion of the screw section, and a stopping surface is formed at the tapered portion and is against an outside portion of the clamping piece.

2. The assembly structure of the faucet control handle of claim 1, wherein the wedging edge of the adjustable base in the adjustable unit has a plurality of recessed edges.

* * * * *